United States Patent [19]
Szpunar et al.

[11] Patent Number: 5,259,728
[45] Date of Patent: Nov. 9, 1993

[54] BLADED DISK ASSEMBLY

[75] Inventors: Stephen J. Szpunar, West Chester; David E. Bulman, Cincinnati, both of Ohio

[73] Assignee: General Electric Company, Cincinnati, Ohio

[21] Appl. No.: 880,441

[22] Filed: May 8, 1992

[51] Int. Cl.$^5$ ............................................. F01D 5/30
[52] U.S. Cl. ........................................ 416/2; 416/221; 416/248
[58] Field of Search ............... 416/2, 131, 135, 219 R, 416/220 R, 221, 248

[56] References Cited

U.S. PATENT DOCUMENTS

| | | | |
|---|---|---|---|
| 2,959,829 | 5/1952 | Dean | 416/221 |
| 3,640,640 | 2/1972 | Palfreyman et al. | 416/2 |
| 4,000,956 | 1/1977 | Carlson et al. | |
| 4,033,705 | 7/1977 | Luebering | 416/221 |
| 4,043,703 | 8/1977 | Carlson | |
| 4,047,840 | 9/1977 | Ravenhall et al. | |
| 4,071,184 | 1/1978 | Carlson et al. | |
| 4,265,595 | 5/1981 | Bucy, Jr. et al. | 416/221 |

OTHER PUBLICATIONS

General Electric Company, "CF6-80 Engine, Student Notebook," Aug. 1981, pp: i 21, and 22, in public use more than one year.

*Primary Examiner*—Edward K. Look
*Assistant Examiner*—James A. Larsen
*Attorney, Agent, or Firm*—Jerome C. Squillaro

[57] ABSTRACT

A bladed disk assembly includes a rotor disk having an axial dovetail slot, and a rotor blade having a dovetail disposed in the slot. A blade retainer is fixedly joined to the disk for retaining the dovetail in the slot. A spacer is disposed in the slot between the blade retainer and the dovetail and is selectively compressible for allowing the dovetail to slide in the slot toward the blade retainer for generating friction forces to dissipate energy upon impact of a predeterminedly sized foreign object.

10 Claims, 6 Drawing Sheets

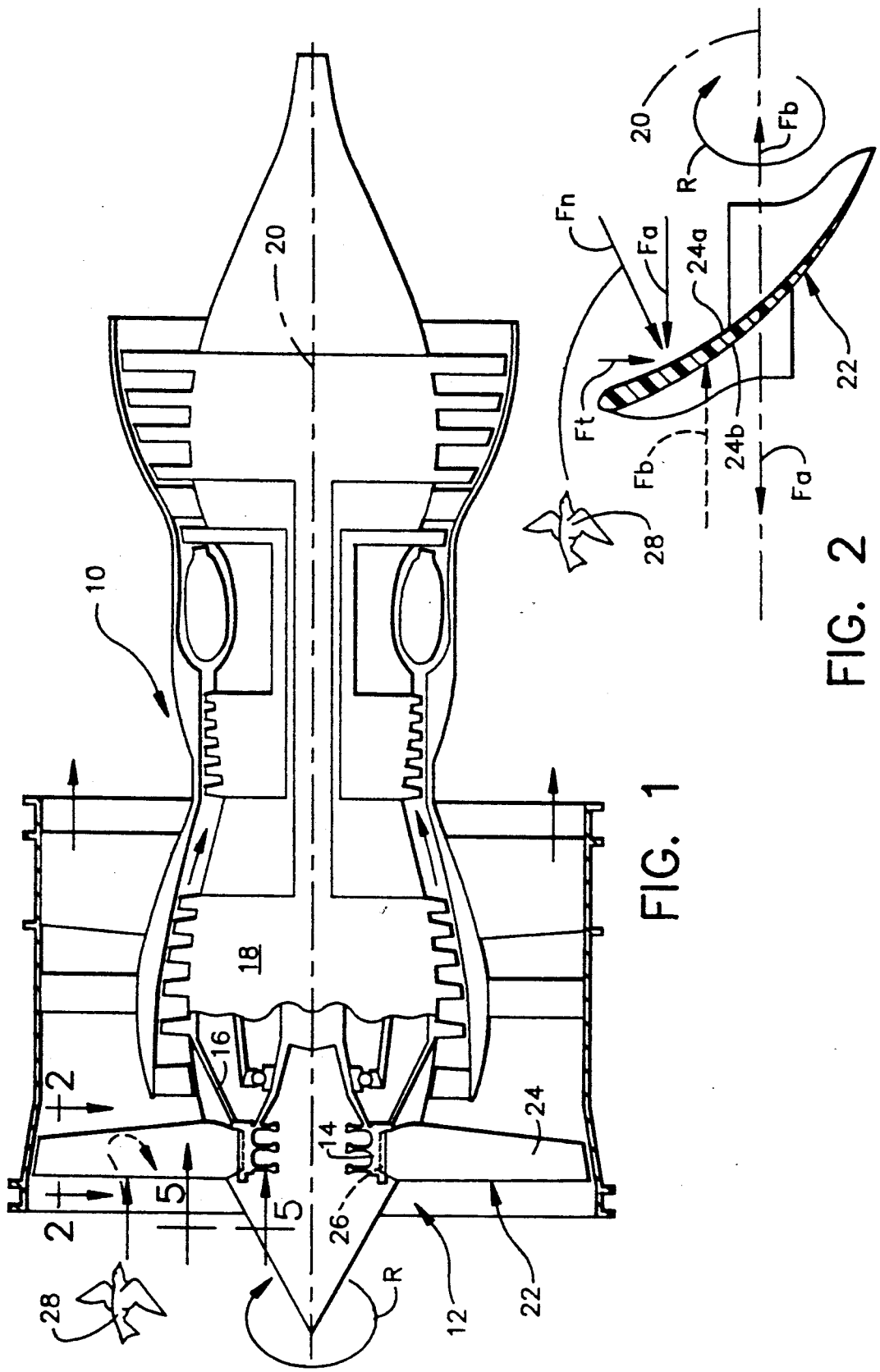

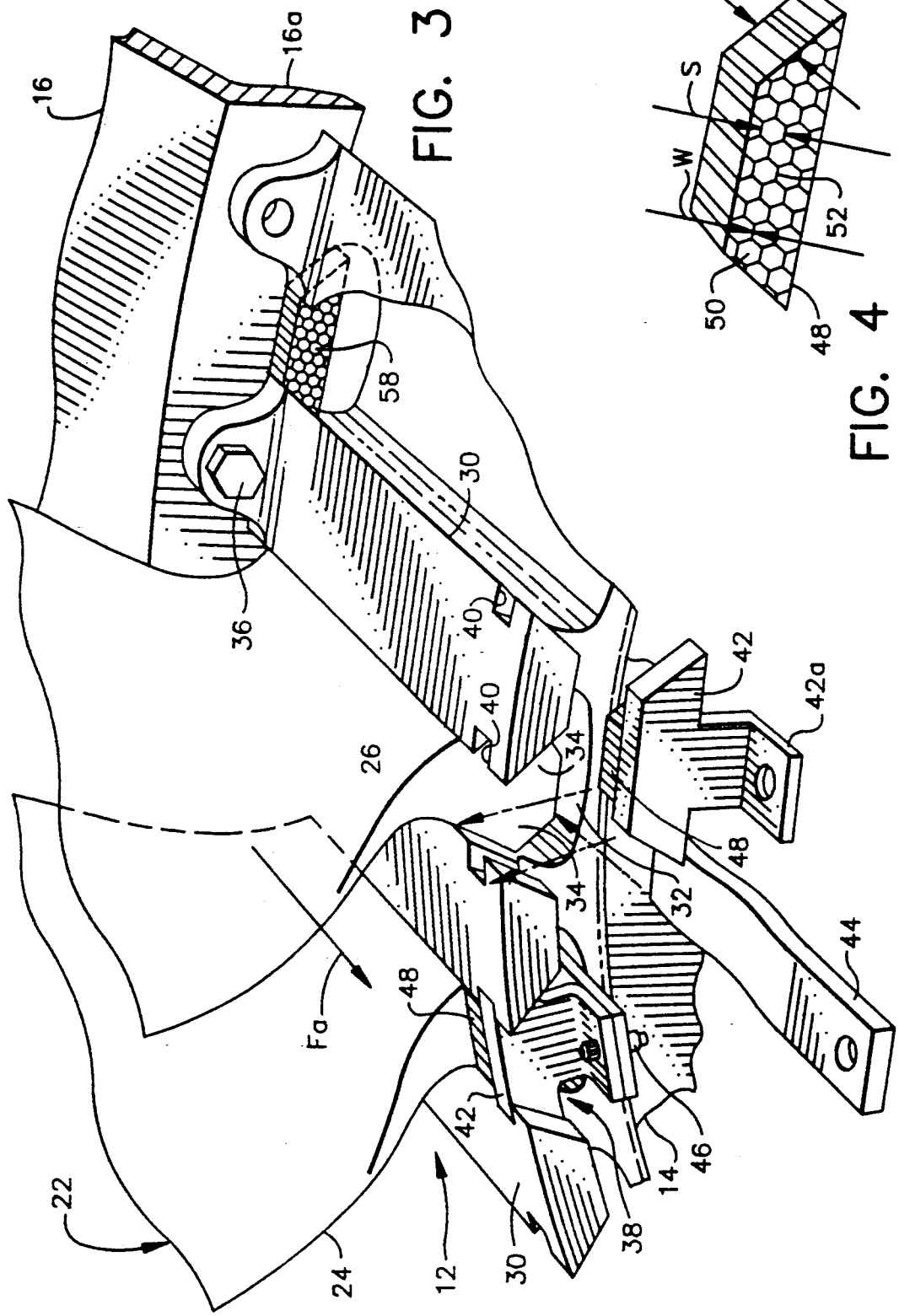

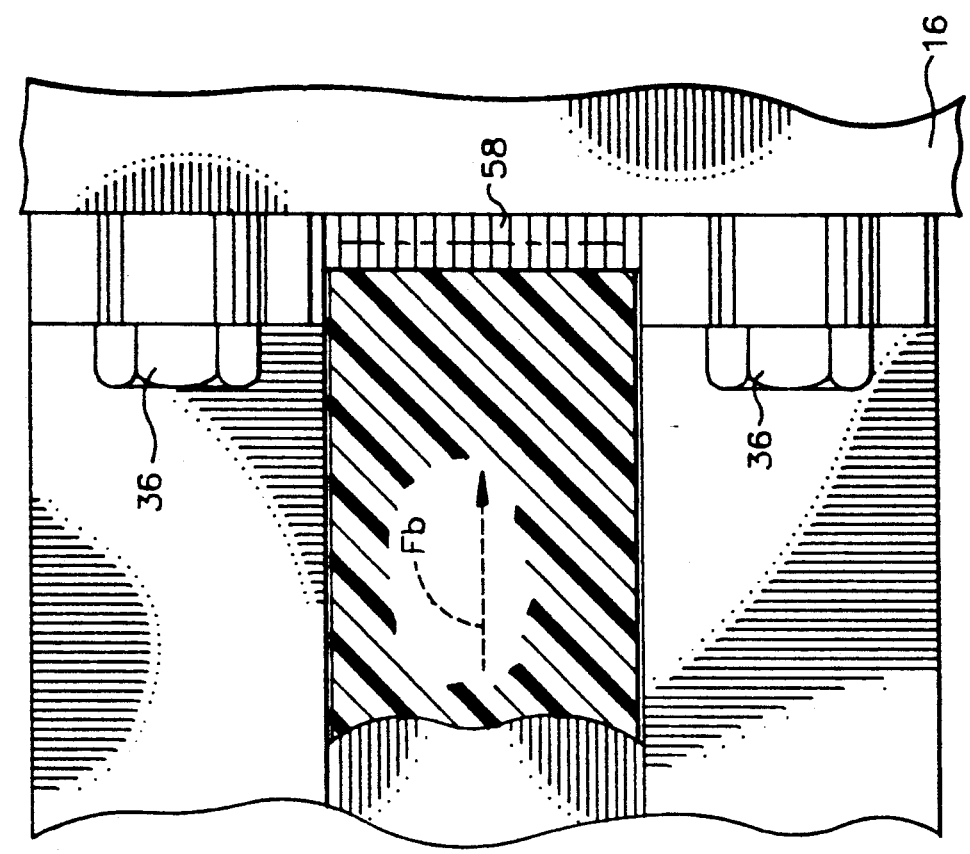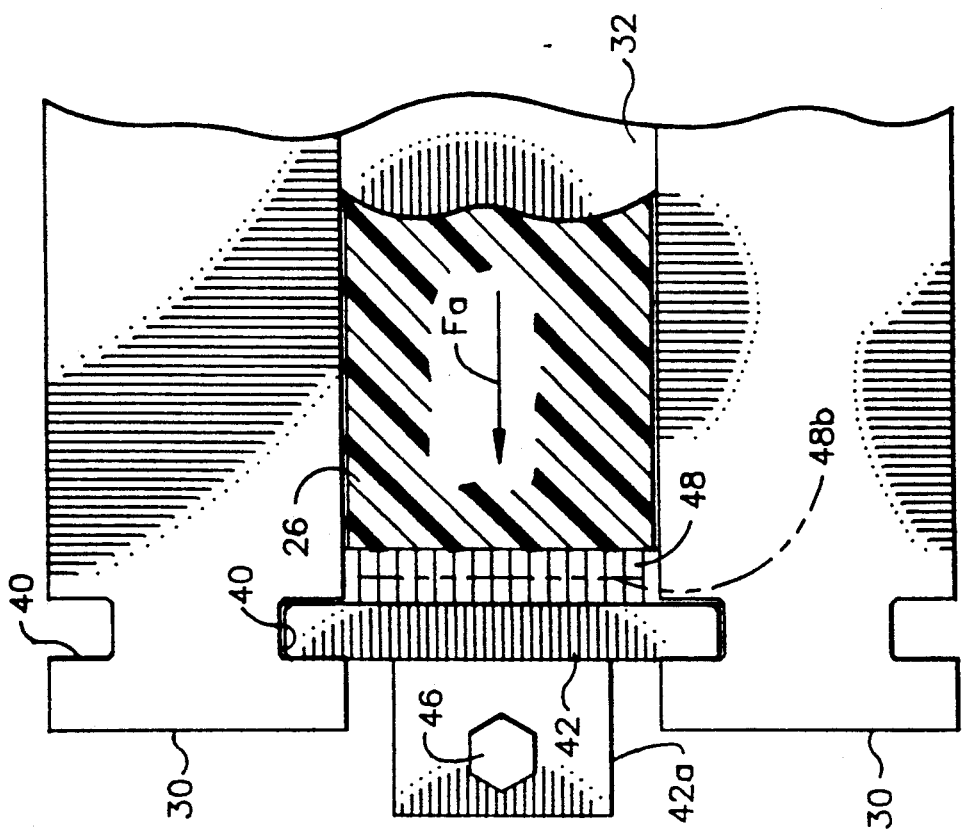
FIG. 7

BLADED DISK ASSEMBLY

The present invention relates generally to gas turbine engine rotor blades, and, more specifically, to an improved bladed disk assembly with axial retention of rotor blades.

BACKGROUND OF THE INVENTION

A conventional gas turbine engine fan includes a rotor disk having a plurality of circumferentially spaced apart rotor fan blades fixedly joined thereto. The rotor disk in one embodiment includes a plurality of circumferentially spaced apart, axially extending dovetail slots in which are respectively slidably inserted a complementary axial entry dovetail of the fan blade for securing the fan blade to the rotor disk. The axial dovetail slots allow for easy assembly of the individual fan blades axially into a respective dovetail slot. Conventional blade retainers are disposed at both forward and aft ends of the dovetails for axially retaining the dovetails in the dovetail slots during operation.

A gas turbine engine fan is typically designed to accommodate foreign object ingestion such as bird strikes against the fan blades thereof without excessive damage which might completely sever a fan blade during operation or cause excessive unbalance of the fan which would require shutdown of the engine during operation. In a gas turbine engine powering an aircraft in flight, bird strikes typically occur during takeoff or descent of the aircraft over an airport runway. Furthermore, in a blade release or blade-out occurrence, the released blade may impact an adjacent blade and impose forces like those in a bird strike. In the bird strike situation, it is desirable that the engine remain operational for providing power as required even in the event of bird ingestion thereto. And, in the blade release situation, preventing damage to the blade retention system of the adjacent blade is desirable.

Since a fan blade typically has a large amount of twist from its root to its tip, a bird strike typically impacts the aft facing or pressure side of the fan blade at high rotational speed thereof during takeoff, for example, which produces impact loads in the fan blade. At relatively low speeds of the fan blade which may occur during descent, for example, a bird might alternatively impact the forward facing or suction side of the fan blade.

In both situations, the bird strikes include an axial component of load at the bird strike location which may be near the fan blade tip, which axial impact load results in a corresponding axial reaction load in the blade retainers, as well as bending moments about the dovetail and root of the blades which create bending stresses therein. The forward bird impact load on the pressure side of the fan blade typically has the largest magnitude which correspondingly creates the largest magnitude axial impact reaction forces in the forward blade retainer and the maximum impact bending stresses at the blade root and dovetail. To accommodate these bird strike axial impact loads, the blade retainers must be suitably sized which increases their weight and requires a correspondingly heavier rotor disk for reacting the impact loads channeled therethrough.

OBJECTS OF THE INVENTION

Accordingly, one object of the present invention is to provide a new and improved bladed disk assembly.

Another object of the present invention is to provide a bladed disk assembly having an improved blade retainer effective for dissipating energy from foreign object impact loads.

Another object of the present invention is to provide a bladed disk assembly effective for accommodating bird strikes of the blade and having reduced weight.

SUMMARY OF THE INVENTION

A bladed disk assembly includes a rotor disk having an axial dovetail slot, and a rotor blade having a dovetail disposed in the slot. A blade retainer is fixedly joined to the disk for retaining the dovetail in the slot. A spacer is disposed in the slot between the blade retainer and the dovetail and is selectively compressible for allowing the dovetail to slide in the slot toward the blade retainer for generating friction forces to dissipate energy upon impact of a predeterminedly sized foreign object.

BRIEF DESCRIPTION OF THE DRAWING

The invention, in accordance with preferred and exemplary embodiments, together with further objects and advantages thereof, is more particularly described in the following detailed description taken in conjunction with the accompanying drawings in which:

FIG. 1 is an axial, partly sectional view of an exemplary aircraft turbofan gas turbine engine having a bladed disk assembly in accordance with one embodiment of the present invention.

FIG. 2 is a transverse, partly sectional view through one of the fan blades illustrated in FIG. 1 taken along line 2—2.

FIG. 3 is a perspective view, in part blowup, of the bladed disk assembly illustrated in FIG. 1 showing three adjacent dovetail slots for receiving respective fan blades retained therein.

FIG. 4 is an enlarged, perspective view of one embodiment of a spacer used in the bladed disk assembly illustrated in FIG. 3.

FIG. 7 is a top, partly sectional view of the bladed disk assembly illustrated in FIG. 5 taken along line 7—7.

DESCRIPTION OF THE PREFERRED EMBODIMENT(S)

Figure 5:
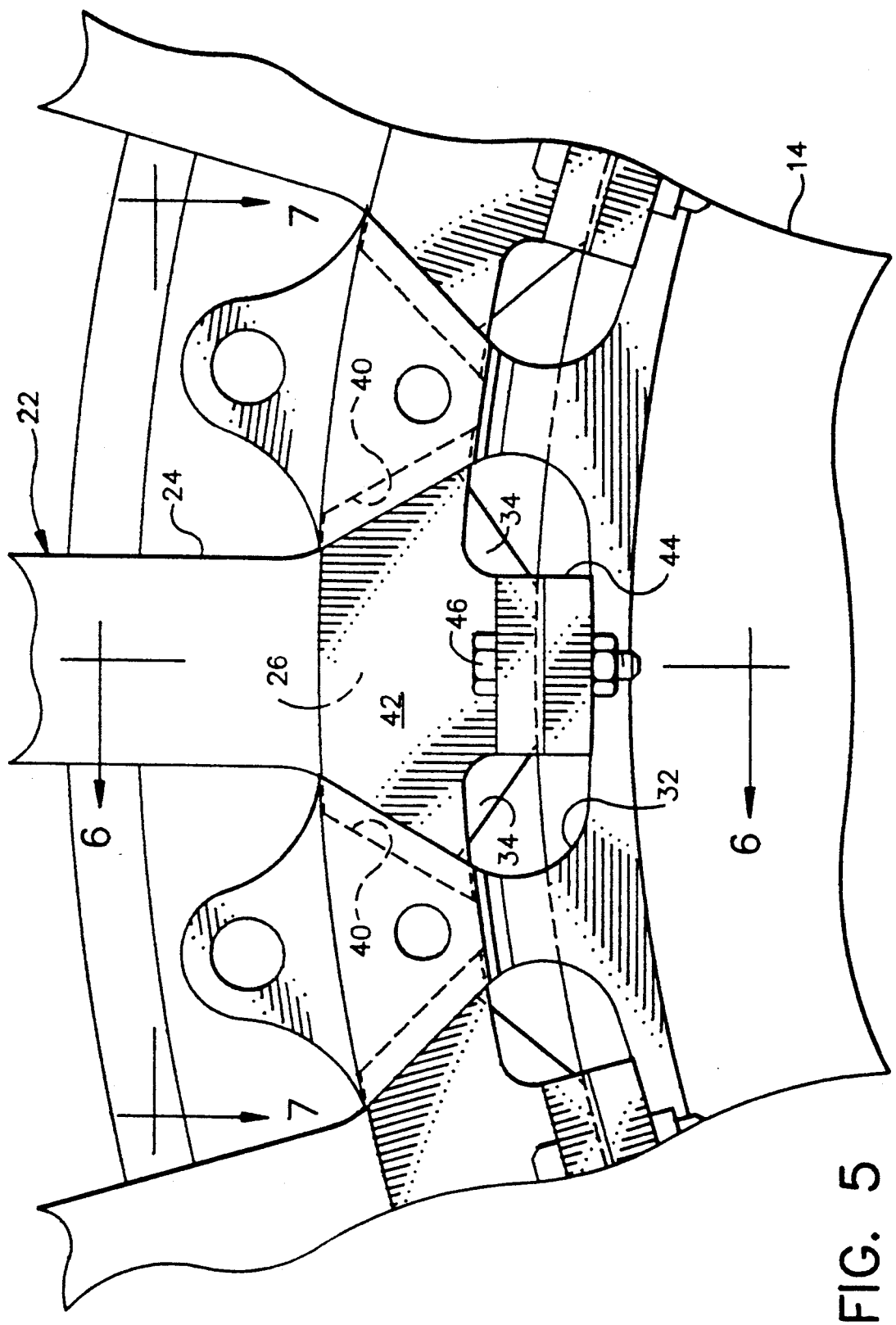
FIG. 5 is an aft facing view of a portion of the bladed disk assembly illustrated in FIG. 1 taken along line 5—5.

Illustrated in FIG. 1 is a schematic representation of an exemplary aircraft turbofan gas turbine engine 10 including a bladed disk assembly 12 in accordance with one embodiment of the present invention. The assembly 12 includes a fan rotor disk 14 which is conventionally joined to a forward cone 16 of a booster compressor 18 coaxially around a longitudinal or axial centerline axis 20 of the engine 10. The fan rotor disk 14 and the booster compressor 18 are conventionally rotated about the centerline axis 20 in the direction labeled R by turbines in a conventionally known manner. Attached to the rotor disk 14 are a plurality of circumferentially spaced apart rotor or fan blades 22 each including an airfoil 24 and an integral dovetail 26.

During operation of the engine 10, the fan blades 22 rotate about the centerline axis 20 and the fan blades 22 are subject to foreign object damage such as that caused by bird strikes. FIG. 1 illustrates an exemplary bird 28 which may be ingested into the fan blades 22 as the engine 10 powers an aircraft during takeoff operation, for example. FIG. 2 illustrates one of the fan blades 22 which has relatively high twist from its root to its tip as shown. Due to this blade twist and the relatively high rotational speed R during takeoff, for example, the bird 28 will normally impact the pressure or aft facing generally concave side 24a of the airfoil as represented by the normal impact load vector $F_n$. The normal impact load $F_n$ may be resolved into a tangential impact load vector designated $F_t$ and an axial impact load vector designated $F_a$. The axial impact load $F_a$ in this exemplary bird strike, is directed in the forward, upstream direction against the airfoil 24 which is transferred to the fan disk 14 through the dovetail 26. Since the bird impact occurs at a radially outer position relative to the dovetail 26, the axial impact load $F_a$ also creates an axial bending moment about the dovetail 26 which creates additional or impact bending stresses at the root of the airfoil 24 where it meets the dovetail 26.

In a conventional configuration, the fan blades 22, the fan disk 14, and the conventional forward blade retainer which retains the blade 12 in the disk 14 must all be suitably sized for accommodating the relatively high axial impact load $F_a$ and resulting bending stresses therefrom which leads to an undesirable increase in weight of the assembly.

Referring to FIG. 3, the bladed disk assembly 12 in accordance with one embodiment of the present invention is shown in more detail and is effective for accommodating the axial impact load $F_a$ and resulting bending stresses therefrom which allows the assembly to be sized smaller than it otherwise would. More specifically, the rotor disk 14 includes a plurality of circumferentially spaced apart, axially extending dovetail posts 30, adjacent ones of which define therebetween an axially extending dovetail slot 32 which is conventionally configured. Each of the blade dovetail 26 has a complementary shape to that of the dovetail slot 32 and in the exemplary embodiment illustrated in FIG. 3 has a pair of circumferentially opposing tangs or lobes 34 conventionally configured.

In this exemplary embodiment, the forward cone 16 of the booster compressor 18 includes a forward radial flange 16a which is conventionally fixedly joined to the aft end of the fan disk 14 by conventional bolts 36. The forward cone radial flange 16a is then used as an aft blade retainer so that when the blade dovetails 26 are axially inserted into their respective slots 32, they will abut the radial flange 16a which prevents further axial travel aft thereof. A forward blade retainer 38 is then fixedly joined to the fan disk 14 after the dovetail 26 is inserted in its respective slot 32 for axially retaining the dovetail 26 in the slot 32 against forward axial travel thereof.

In the exemplary embodiment illustrated in FIG. 3, each of the dovetail posts 30 includes a pair of radially extending and circumferentially inclined capture grooves 40 circumferentially spaced from and facing a respective capture groove 40 of an adjacent one of the dovetail posts 30. The forward blade retainer 38 includes retainer plate 42, which in this exemplary embodiment has a trapezoidal configuration, which may be inserted radially outwardly into respective ones of the capture grooves 40 as shown in FIG. 3. The right hand retainer plate 42 illustrated in FIG. 3 is being inserted upwardly into the respective capture grooves 40, whereas the left hand retainer plate 42 is fully inserted into its respective capture grooves 40. The trapezoidal shape of the retainer plates 42 and the circumferentially inclined capture grooves 40 provide a triangular configuration which limits the radially outward travel of the retainer plate 42 in the capture grooves 40 for thusly securing the retainer plate 42 against centrifugal force during operation. The retainer plates 42 are, therefore, removably disposed in adjacent ones of the capture grooves 40 for allowing easy assembly and disassembly thereof. Once installed in the capture grooves 40, the retainer plate 42 retains the dovetail 26 in the dovetail slot 32 against axially forward movement.

Figure 6:
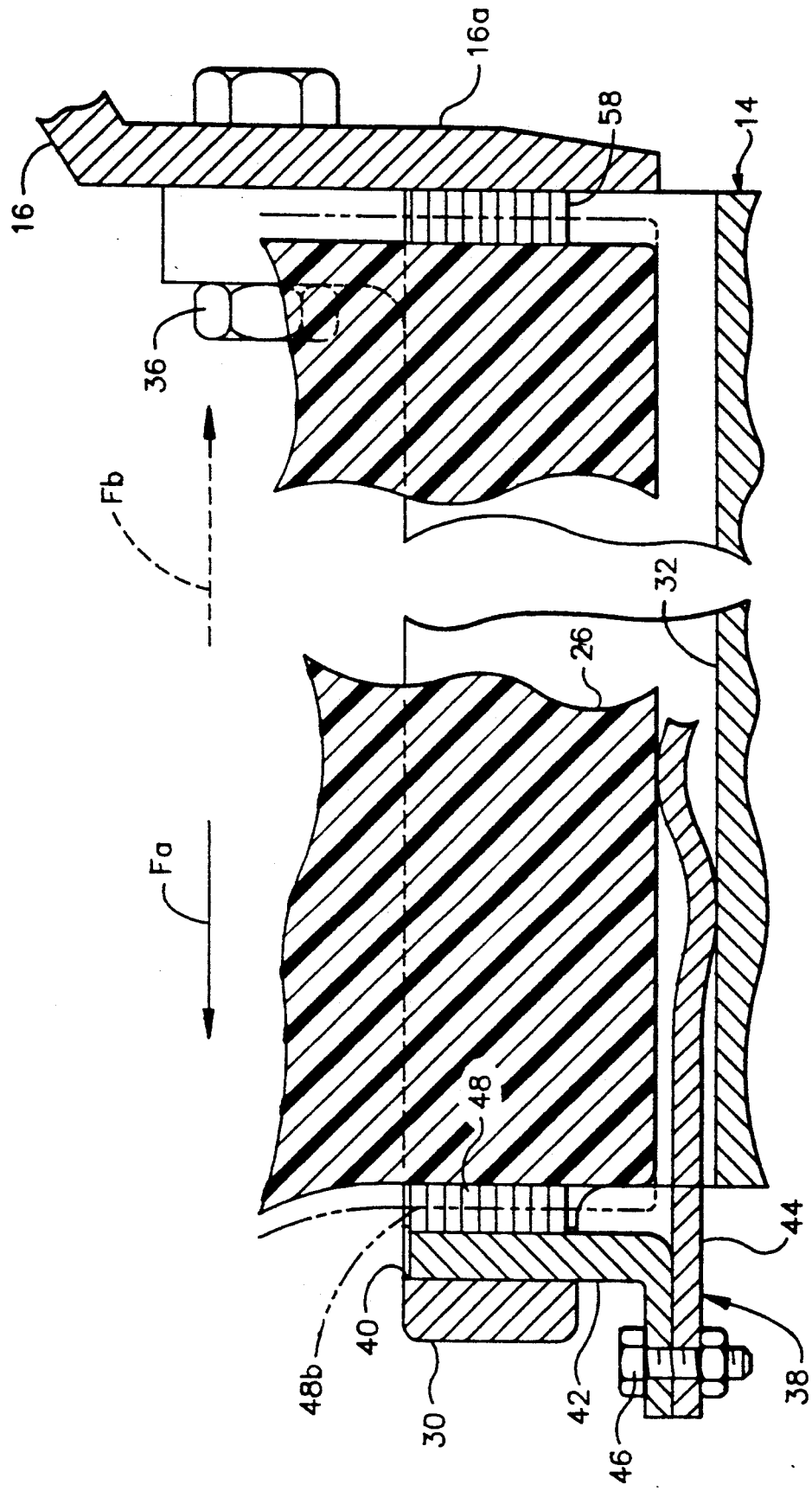
FIG. 6 is an enlarged axial sectional view of the bladed disk assembly illustrated in FIG. 5 taken along line 6—6.

In the exemplary embodiment illustrated in FIGS. 3, 5 and 6 the forward blade retainer 38 further includes an axially elongate spring 44 in the form of a cantilever beam which is fixedly joined to the retainer plate 42 and extends axially into the dovetail slot 32 and resiliently radially upwardly against the bottom of the dovetail 26 for preloading the dovetail 26 radially upwardly in the slot 32. The right hand blade retainer 38 illustrated in FIG. 3 is shown in exploded view with the retainer plate 42 being firstly inserted radially upwardly into the capture grooves 40, and then the retainer spring 44 may be axially inserted into the dovetail slot 32 between the bottom of the dovetail 26 and the dovetail slot 32 to its final position as illustrated for the left hand blade retainer 38 illustrated in FIG. 3. The bottom of the retainer plate 42 preferably includes an axially extending flange 42a through which a conventional bolt 46 extends for fixedly joining the retainer plate 42 to the retainer spring 44. FIG. 5 illustrates an aft facing view of the retainer plate 42 joined to the retainer spring 44 by the bolt 46. FIG. 6 illustrates in an axial sectional view, the assembled forward blade retainer 38 including the retainer spring 44 between the bottom of the dovetail 26 and the dovetail slot 32. The distal end of the retainer spring 44 is serpentine so that it may resiliently contact both the bottom of the dovetail 26 and the dovetail slot 32 for resiliently preloading the dovetail 26 upwardly against the restraining portions of the dovetail slot 32. FIG. 7 illustrates a top view of the forward blade retainer 38 in the capture grooves 40.

A significant feature of the present invention is a retainer first or forward spacer 48 shown, for example, in FIG. 3 disposed in the dovetail slot 32 between the blade retainer 38 and the dovetail 26. The first spacer 48 is predeterminedly compressible in accordance with the present invention for allowing the dovetail 26 to slide in the slot 32 toward the blade retainer 38 for generating friction forces between the dovetail 26 and its complementary retaining surfaces of the dovetail slot 32 to dissipate by friction energy transmitted thereto due to the axial impact force $F_a$ from a predeterminedly large bird strike, or from the blade release occurrence.

More specifically, and referring to FIGS. 3, 6, and 7, the forward spacer 48 is disposed axially between the retainer plate 42 and the forward end of the dovetail 26 in abutting contact therewith so that the axial impact force $F_a$ and other normal axial forces are directly transmitted from the dovetail 26 forwardly through the forward spacer 48 and to the retainer plate 42, and in turn to the dovetail posts 30. The forward spacer 48 is preferably sized and configured for remaining rigid and intact during normal operation and for small bird strikes, and buckling upon reaching a predetermined limit $F_{max}$ of the axial impact force $F_a$ transmitted from the dovetail 26 to the blade retainer 38 through the forward spacer 48 during a large bird strike. Accordingly, the forward spacer 48 will provide a direct load path from the dovetail 26 to the retainer plate 42 for conventional, normal transfer of axial forces therethrough while retaining the dovetail 26 against axial movement in the dovetail slot 32 during normal operation.

During the large bird strike occurrence, for example, the impacting bird 28 provides a short duration, impulse-type impact load on the airfoil 24 which momentarily produces the relatively high axial impact load $F_a$. In a conventional design, the fan blade 22, the fan disk 14, and the forward blade retainer 38, without the forward spacer 48, would necessarily be sized relatively large to accommodate also the possibility of the axial impact load $F_a$ due to the bird strike. However, in accordance with one object of the present invention, the collapsible forward spacer 48 is used to allow some axial movement of the dovetail 26 in the slot 32 for dissipating a significant portion of the energy in the bird strike which will reduce the axial reaction loads and moments and the resulting stresses generated in the root of the airfoil 24 and in adjacent structures. This allows a structurally more efficient, and lighter weight assembly for accommodating the same amount of expected impact load from the bird strike.

Referring to FIGS. 6 and 7, the forward spacer 48 is illustrated in solid line in its original, undistorted configuration. The predetermined limit of the axial force $F_{max}$ may be conventionally determined for each design application to have a magnitude on the order of that associated with a given, designed-for bird strike occurrence. For example, U.S. Government (Federal Aviation Administration-FAA) regulations include the requirement to safely ingest a relatively large bird of about 1 kilogram. The impact forces of such a large bird on the airfoil 24 can be resolved in conventional fashion for determining an appropriate limit $F_{max}$ for the axial impact force $F_a$. The forward spacer 48 may then be conventionally designed to buckle or collapse only upon reaching the predetermined axial force limit $F_{max}$. Shown in dashed line in FIGS. 6 and 7 and designated 48b is the buckled or collapsed configuration of the forward spacer 48 after the axial impact load $F_a$ exceeds the predetermined limit $F_{max}$ due to the bird strike. The axial impact force $F_a$ will drive the dovetail 26 in the forward direction for compressing the forward spacer 48 against the retainer plate 42. As the forward spacer 48 compresses, by buckling for example, the dovetail 26 is allowed to slide, which generates a substantial amount of friction forces between the dovetail 26 and the dovetail slot 32 for dissipating energy, which also reduces the axial reaction forces transmitted to the retainer plate 42.

More specifically, in a conventional rigidly secured fan blade, the bird impact creates the axial impact load $F_a$ with an equal but opposite axial reaction load effected by the forward blade retainer. The axial impact load $F_a$ also effects an axial bending moment at the blade root which is equal to the product of the axial impact load $F_a$ and the length from the point of impact to the root reaction plane. The axial impact force $F_a$ and its resulting impact moment are substantial for the required large bird strike. However, by allowing the dovetail 26 to travel slightly forwardly upon the bird strike, the total axial reaction loads on the dovetail 26 are reduced by the inertia force of accelerating the mass of the fan blade 22 forwardly, i.e., mass times acceleration. And, the bending moment at the blade root reaction plane is also reduced by the product of the inertia force of the fan blade at its center of gravity and its moment arm. In this way, the limited axial sliding of the dovetail 26 within the dovetail slot 32 following a bird strike which causes the forward spacer 48 to buckle, both reduces the total axial reaction forces at the dovetail 26, which includes the sliding friction forces between the dovetail 26 and the slot 32 and the force reacted by the retainer plate 42, and allows the friction forces to dissipate some of the bird strike energy as the dovetail 26 slides.

Accordingly, energy from the bird strike is dissipated by the buckling of the forward spacer 48 itself, as well as by the substantial friction forces between the dovetail 26 and the dovetail slot 32 as the dovetail 26 slides therein. In a conventional assembly, the dovetail 26 is prevented from sliding axially during operation and, therefore, friction dissipating forces cannot be produced, and full magnitude axial reaction forces are transmitted to the retainer plate 42. In the present invention, the buckling forward spacer 48 allows bird strike impact energy to be dissipated, while still axially retaining the dovetail 26 in the dovetail slot 32 since the retainer plate 42 and the remaining forward spacer 48 prevent unrestrained ejection of the dovetail 26 from the dovetail slot 32.

Referring again to FIG. 3, the forward spacer 48 may be simply loosely disposed, i.e. not attached, between the retainer plate 42 and the forward end of the dovetail 26, but in the preferred embodiment, it is conventionally fixedly joined to the retainer plate 42 and abuts the dovetail 26 in the dovetail slot 32. The forward spacer 48 may be joined to the retainer plate 42 by any conventional manner including welding, brazing, or the use of conventional adhesives. In this way, the forward spacer 48 is integrally joined to the retainer plate 42 for allowing ease of assembly therewith.

Illustrated in FIG. 4 is an exemplary embodiment of the forward spacer 48 in the form of a conventional hexagonal honeycomb having a plurality of honeycomb cells 50 which is substantially rigid for reacting axial loads during normal operation. Each of the cells 50 is defined by walls 52 which extend axially, or perpendicularly between the retainer plate 42 and the forward end of the dovetail 26 when assembled. The cells 50 in this exemplary embodiment are hollow and have a size designated S representing the distance between opposing walls 52 thereof. Each of the walls 52 has a wall thickness W, and the forward spacer 48 has thickness T represented by the length of the walls 52 as measured perpendicularly between the retainer plate 42 and the forward end of the dovetail 26. The buckling strength ability of the forward spacer 48 may be conventionally varied by varying any one of the cell size S, wall thickness W, and spacer thickness T. The cell size S and the wall thickness W are primary variables which may be preselected for allowing the forward spacer 48 to buckle upon reaching the predetermined axial force limit $F_{max}$. The thickness T should preferably be as large as practical to maximize energy dissipation by friction, and to minimize any remaining axial impact load on the retainer plate 42.

The honeycomb forward spacer 48, therefore, provides a relatively axially rigid structure effective for directly transmitting all axial force from the dovetail 26 to the retainer plate 42 as a rigid member without axial movement of the dovetail 26 during normal operation of the fan blades 22. However, in the event of a sufficiently large bird strike against one of the fan blades 22, the forward spacer 48 will buckle and compress in thickness as shown in dotted line 48$b$ in FIG. 6 when the predetermined axial force limit $F_{max}$ is reached and exceeded. Upon being compressed, the forward spacer 48 reduces the resulting axial reaction loads and moments and allows dissipation of some of the bird strike energy by sliding friction between the dovetail 26 and the slot 32. In this way, the resulting damage to the fan blade 22 is reduced, which reduces the likelihood of secondary damage to the forward blade retainer 38 itself or the dovetail posts 30 of the rotor disk 14. The individually damaged fan blades 22 may then be replaced during maintenance, and the rotor disk 14 and the forward blade retainers 38 may be reused as appropriate.

Figure 8:
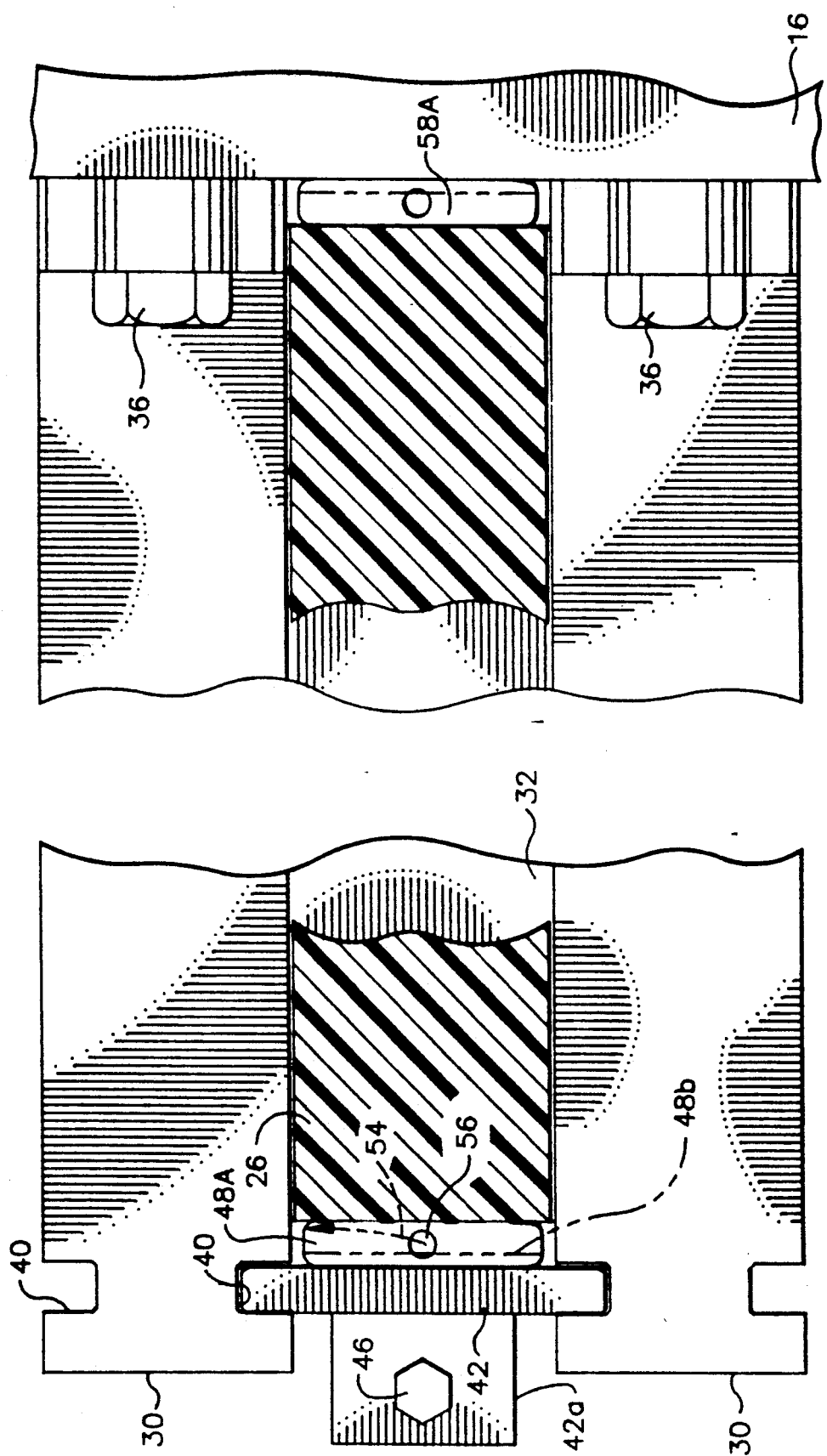
FIG. 8 is a view similar to FIG. 7 illustrating an alternate embodiment of spacers used in the bladed disk assembly.

The forward spacer 48 may take any suitable alternate form having the ability to transmit axial force therethrough from the dovetail 26 to the retainer plate 42 without significant movement of the dovetail 26 below the predetermined axial force limit $F_{max}$, but upon reaching that limit, the forward spacer 48 should be suitably compressible for allowing sliding movement of the dovetail 26 within the slot 32 for dissipating energy by friction. For example, illustrated in FIG. 8 is an alternate embodiment of the forward spacer 48 designated 48A in the form of a bladder containing a viscous fluid 54 which may either be a liquid or a gas. The bladder 48A includes a normally closed metering orifice 56 which seals the fluid 54 inside the bladder 48A. The bladder 48A may be any conventional material such as a suitable metal, for example stainless steel, which forms a container completely filled with the fluid 54 to maintain its rigidity. The metering orifice 56 may simply be a relatively thin circular membrane of the bladder material having a predetermined thickness which will allow it to be separated from the bladder 48A when the predetermined axial force limit $F_{max}$ is reached which compresses the bladder 48A increasing the pressure of the fluid 54 therein to break open the membrane of metering orifice 56. Or, a plug could be used in the orifice 56 and ejected under a suitably high pressure of the fluid 54.

The metering orifice 56 will open when the bladder 48A is compressed between the retainer plate 42 and the forward end of the dovetail 26 at the predetermined axial force limit $F_{max}$ for ejecting the fluid 54 as shown in dashed line in FIG. 8 from the bladder 48A to allow the dovetail 26 to slide in the slot 32 for generating friction to dissipate the bird strike energy. The metering orifice 56 is preselected in size to control the rate at which the fluid 54 is ejected from the bladder 48A during the relatively fast bird strike occurrence, with the smaller the size, the slower the rate. The bladder 48A will then be compressed as shown in dashed line 48$b$ in FIG. 8 as the fluid 54 is ejected therefrom. The fluid 54 could be a liquid containing a dye for example to more readily indicate the collapse of the bladder 48A in the event that the bird strike damage of the airfoil 24 is not readily apparent, or may be a gas such as air with a suitably small metering orifice 56.

Referring again to FIG. 2, it is also possible that for relatively low rotational speeds R of the fan blades 22, such as during descent of the aircraft during landing, the bird 28 may strike the forward facing, suction or convex side 24$b$ of the airfoil 24 and impart an aft directed axial impact force desingated $F_b$ and shown in dashed line. Accordingly, a second, or aft spacer 58 as shown in FIG. 3 may be disposed between the dovetail 26 and the aft blade retainer, which is shown in the form of the forward cone radial flange 16$a$. Accordingly, both the forward spacer 48 and the aft spacer 58 may be used if desired, with the forward spacer 48 being disposed at the forward end of the dovetail 26, and the aft spacer 58 being disposed at the opposite or aft end of the dovetail 26 against the radial flange 16$a$. The aft spacer 58 is preferably substantially identical to the forward spacer 48 in structure and in operation and is additionally shown in the honeycomb (58) and bladder (58A) embodiments in FIGS. 6-8 in solid line in its uncompressed form, and in dashed line after its collapse following a bird strike exceeding the force limit $F_{max}$ of the aft directed axial impact load $F_b$.

The forward and aft spacers 48, 58 may take other alternate forms including for example a plurality of axially aligned pins in a suitable matrix (not shown) which will allow the pins to buckle upon reaching the predetermined axial impact force limit $F_{max}$.

In all of these exemplary embodiments, the spacers 48, 58 in combination with their respective blade retainers suitably rigidly retain the dovetails 26 without axial movement under normal operating conditions, but allow axial movement of the dovetails 26 during the bird strike occurrence, for example, for dissipating the energy therefrom as described above. The resulting axial reaction forces transmitted through the forward blade retainer 38 and the dovetail posts 30, for example, are reduced below those forces which would be effected if the dovetail 26 were not allowed to slide during the bird strike. This reduces the blade root loads and moments induced in the fan blade 22, which increases the bird strike capability of the blade 22 for a given blade root and blade dovetail 26 geometry. It also allows a lighter-weight blade retention design due to the reduction in the peak loads expected during a bird strike event. Under normal operating conditions, the blade retainer 38 and the forward spacer 48 accurately position the fan blade 22 in the dovetail slot 32 and react the normal blade gas and vibratory loads. And, under the bird strike event, energy therefrom is dissipated by sliding friction between the dovetail 26 and the dovetail slot 32 for providing an improved assembly. This is particularly significant when the fan blades comprise composite materials as used in the present, exemplary embodiment of the invention. However, the fan blades 22 may also be non-composite conventional materials such as titanium, for example, with the spacers 48, 58 still providing their benefits as described above.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is claimed and desired to be secured by Letters Patent of the United States is the invention as defined and differentiated in the following claims:

1. A bladed disk assembly comprising:
a rotor disk having an axial dovetail slot;
a rotor blade including an airfoil and a dovetail disposed in said slot;
a blade retainer fixedly joined to said disk for retaining said dovetail in said slot; and
a first spacer disposed in said slot between said blade retainer and said dovetail, said first spacer being substantially rigid up to a predetermined limit of axial force transmitted from said dovetail to said blade retainer through said first spacer, and predeterminedly compressible upon reaching said limit for allowing said dovetail to slide in said slot toward said blade retainer for generating friction forces to dissipate energy.

2. An assembly according to claim 1 wherein said first spacer is sized and configured for buckling upon reaching said predetermined limit of axial force transmitted from said dovetail to said blade retainer through said first spacer.

3. An assembly according to claim 2 wherein:
said rotor disk includes a pair of dovetail posts defining therebetween said dovetail slot, each of said posts including a radially extending capture groove circumferentially facing a respective capture groove of an adjacent one of said posts;
said blade retainer includes a retainer plate removably disposed in adjacent ones of said capture grooves for retaining said dovetail in said slot; and
said first spacer is disposed between said retainer plate and said dovetail in contact therewith.

4. An assembly according to claim 3 wherein said first spacer is fixedly joined to said retainer plate and abuts said dovetail in said slot.

5. An assembly according to claim 4 wherein said first spacer comprises a honeycomb having a plurality of cells.

6. An assembly accordingly to claim 5 wherein said honeycomb cells have a size and a wall thickness preselected for allowing said first spacer to buckle upon reaching said predetermined axial force limit.

7. An assembly according to claim 6 wherein said predetermined axial force limit corresponds with a bird striking said blade airfoil, said bird having a weight of about 1 kilogram.

8. An assembly according to claim 4 wherein said first spacer comprises a bladder containing a fluid; said bladder having a normally closed metering orifice which opens when said bladder is compressed between said retainer plate and said dovetail at said predetermined axial force limit for ejecting said fluid from said bladder to allow said dovetail to slide in said slot for generating friction.

9. An assembly according to claim 4 wherein said blade retainer further includes an elongate spring fixedly joined to said retainer plate and extending into said slot and resiliently against said dovetail for preloading said dovetail radially upwardly in said slot.

10. An assembly according to claim 4 further including a second spacer substantially identical to said first spacer; said first spacer being disposed at one end of said dovetail, and said second spacer being disposed at a second, opposite end of said dovetail.

* * * * *